W. H. SAUVAGE.
SLACK ADJUSTER FOR AUTOMATIC BRAKE SYSTEMS.
APPLICATION FILED JULY 2, 1912.
1,062,666.
Patented May 27, 1913.
3 SHEETS—SHEET 1.
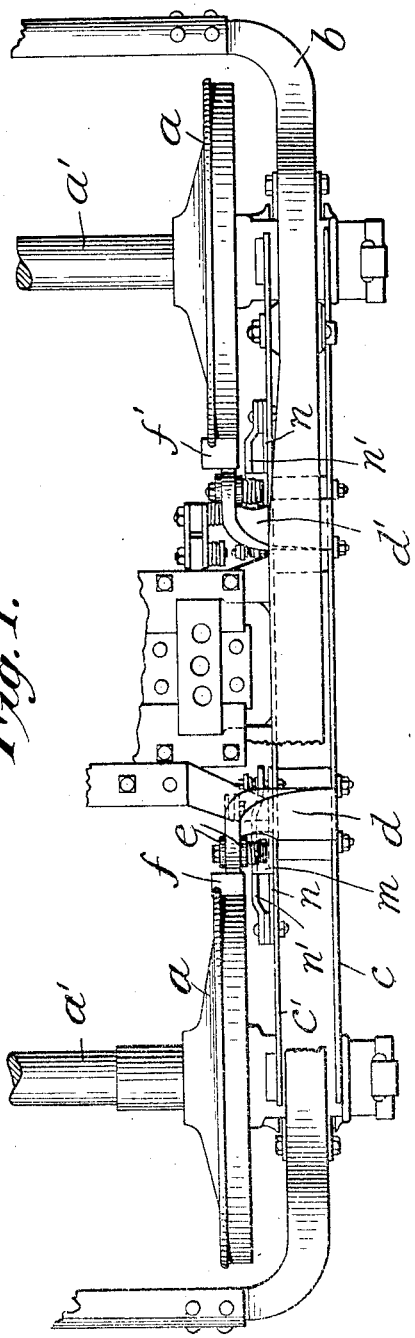
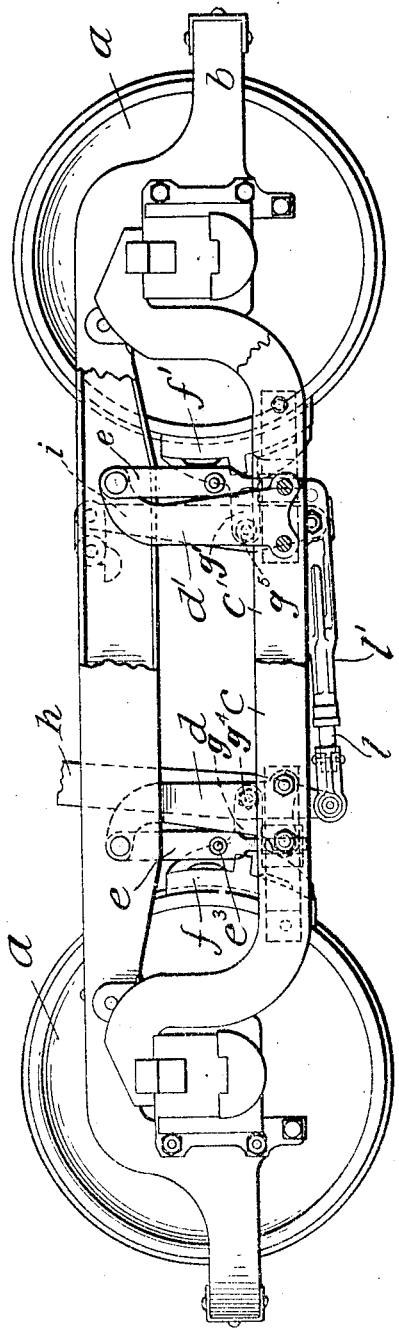

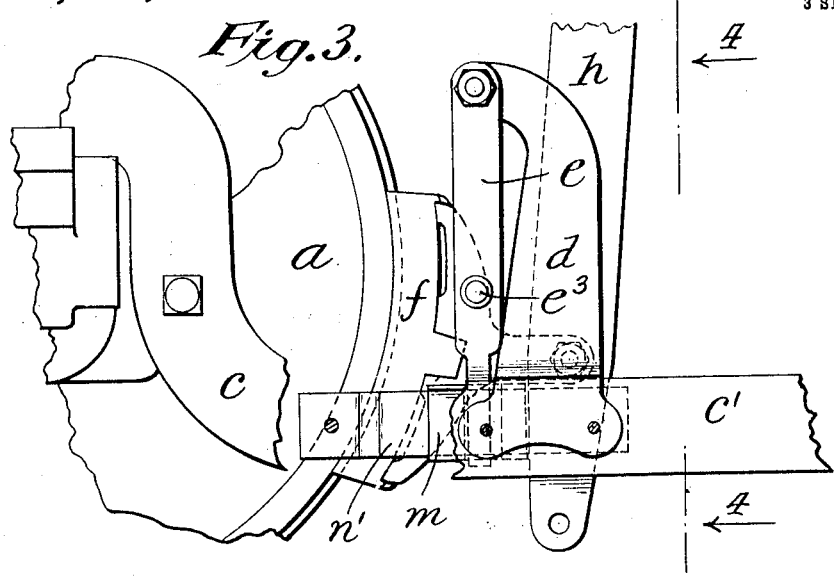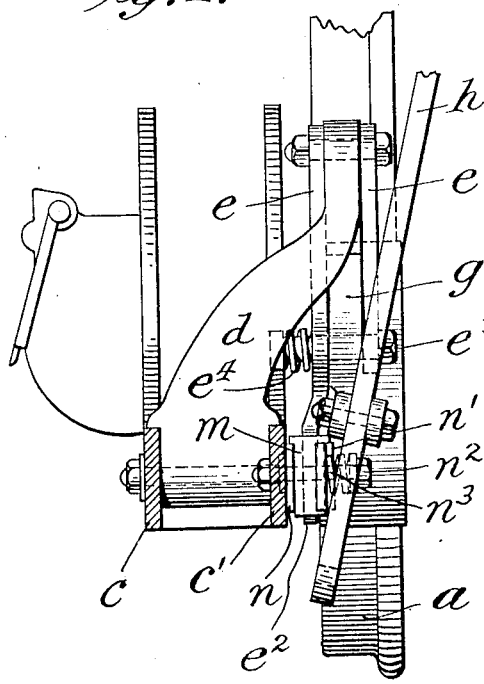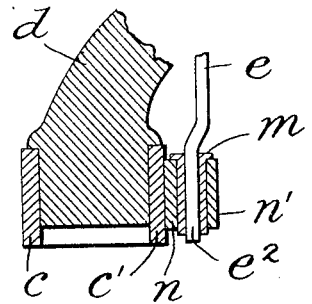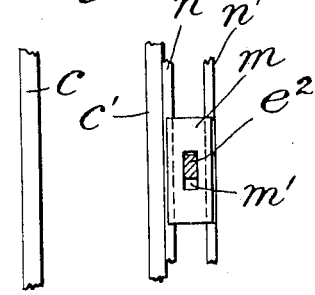

W. H. SAUVAGE.
SLACK ADJUSTER FOR AUTOMATIC BRAKE SYSTEMS.
APPLICATION FILED JULY 2, 1912.

1,062,666.

Patented May 27, 1913.
3 SHEETS—SHEET 3.

Attest:
Edgeworth Greene
R. J. McGuire by

Inventor:
William H. Sauvage
Redding & Greeley
Attys.

UNITED STATES PATENT OFFICE.

WILLIAM H. SAUVAGE, OF NEW YORK, N. Y.

SLACK-ADJUSTER FOR AUTOMATIC BRAKE SYSTEMS.

1,062,666.  Specification of Letters Patent.  Patented May 27, 1913.

Application filed July 2, 1912.  Serial No. 707,200.

*To all whom it may concern:*

Be it known that I, WILLIAM H. SAUVAGE, a citizen of the United States, residing in the borough of Manhattan of the city of New York, State of New York, have invented certain new and useful Improvements in Slack-Adjusters for Automatic Brake Systems, of which the following is a specification, reference being had to the accompanying drawings, which form a part hereof.

This invention relates to slack adjusting mechanisms of that type in which the live lever and dead lever are connected, above their lower ends, by an adjusting rod, as well as by the usual bottom rod at their lower ends. The construction of the trucks or of the brake mechanism does not always make it convenient or even feasible to employ such an adjusting rod and it is the object of this invention to provide means whereby the functions of the adjusting rod may be accomplished while the adjusting rod itself is dispensed with.

In accordance with the invention each hanger, by which the brake head and shoe and other connected parts are supported from the truck frame, or a part immediately connected therewith or supported thereby, is arranged to engage, with freedom for such lost motion as is necessary to give the required brake shoe clearance, a block or shoe which is normally stationary but is held frictionally so that its position is shifted automatically by the movement of the brake mechanism as automatic adjustments are effected therein to compensate for wear on brake shoes and wheels.

The invention is capable of embodiment in various forms, some of which will be explained hereinafter with reference to the accompanying drawings in which they are illustrated and in which—

Figure 7:
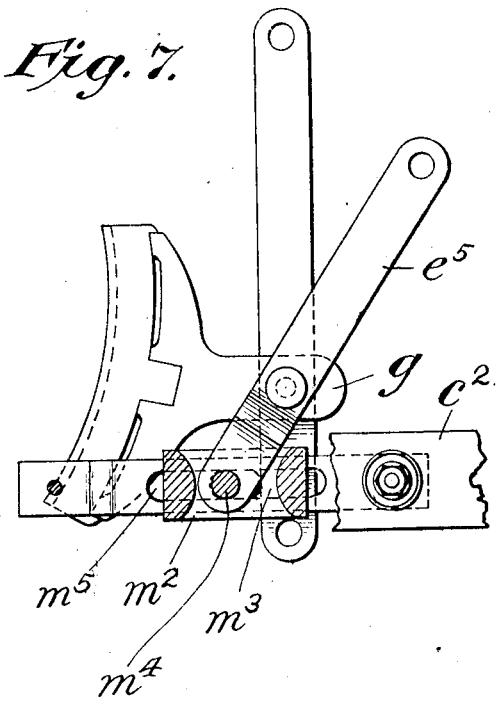
Figure 8:
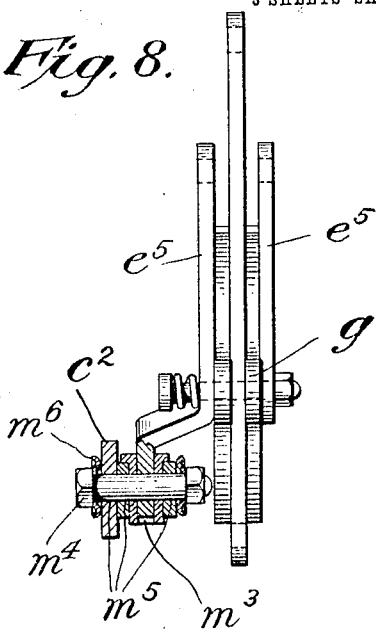
Figure 9:
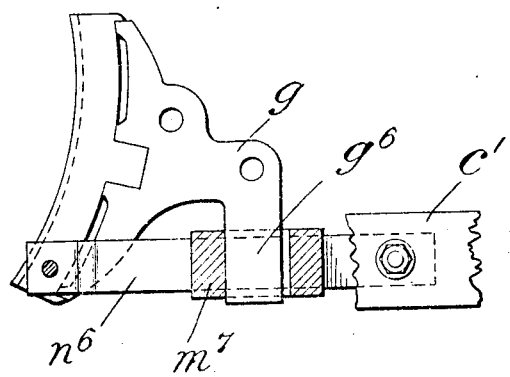

Figure 1 is a top view of a portion of a railway truck equipped with the improved adjusting devices, a portion of the truck frame being broken away to disclose parts below it. Fig. 2 is a view of the same in elevation, a portion of the truck frame and of one of the equalizing bars being broken away to disclose details of construction. Fig. 3 is a detail view in side elevation on a somewhat larger scale. Fig. 4 is a view in section on the plane indicated by the line 4—4 of Fig. 3, as seen from the right hand in Fig. 3. Fig. 5 is a detail view partly in transverse section and partly in elevation illustrating particularly the friction block or shoe and its relation to the hanger. Fig. 6 is a top view illustrating the relations of the same parts. Figs. 7 and 8 are detail views illustrating an embodiment of the invention in which the block or shoe engaged by the hanger has frictional engagement with one of the equalizer bars. Fig. 9 is a detail view illustrating still another embodiment of the invention, in which the friction shoe or block, instead of being engaged directly by the hanger is engaged by a part carried with the hanger, that is, the brake head. Referring first to the construction shown in Figs. 1–6, the wheels $a$, axles $a'$, truck frame $b$ and equalizers $c$ and $c'$ represent so much of an ordinary railway car truck as is necessary to enable the application of the invention to be understood. In this construction brackets $d$ and $d'$ are secured between the equalizing bars $c$ and $c'$, adjacent to the corresponding wheels and at their upper ends have pivotally hung thereon the hangers $e$ and $e'$ by which the brake shoes and other parts are suspended. The brake shoes $f$ and $f'$ are carried as usual by the brake heads $g$ and $g'$ and the latter are pivotally hung, as at $e^3$, between the two members of the corresponding hangers $e$ and $e'$. The brake head $g$ is pivotally connected, as at $g^4$, to the usual live lever $h$ and the brake head $g'$ is pivotally connected, as at $g^5$, to the dead lever $i$, the live lever being connected to the brake actuating mechanism as usual and the dead lever being anchored on the truck frame as usual. The live and dead levers $h$ and $i$ are connected at their lower ends by an automatically extensible and adjustable coupling bar which comprises two telescoping members $l$ and $l'$ which are adapted to be relatively displaced and held in their new relative positions by suitable means, as shown, for example, in Letters Patent of the United States No. 963,947, dated July 12, 1910, for the purpose of compensating for the wear on wheels and brake shoes, in the usual manner. All of the parts thus far referred to may be constructed and arranged to operate in any usual or suitable manner.

Heretofore, the live and dead levers have been connected by an adjusting member comprising two, relatively movable members which have frictional engagement with each other, but in some cases it is not convenient or even feasible to use such an adjusting bar and it is the object of this invention to provide means whereby the functions of such an adjusting bar may be accomplished without the use of the bar itself. Accordingly there is provided for each brake head a frictionally held shoe or block with respect to which the brake head has the proper degree of lost motion to permit the necessary clearance between the brake shoe and the wheel to be secured when the brakes are released, while the shoe or block may be moved with reference to its support so as to compensate for wear on the brake shoes and wheels. It will be obvious that the brake head and friction shoe or block may be arranged in different ways to accomplish the desired purpose, and several different ways are shown in the accompanying drawings. Preferably, however, the connection between the brake head and the friction shoe or block is accomplished through the hanger which supports the brake head, as shown in Figs. 1–6. In this construction the two hangers $e$ and $e'$ are similarly constructed and arranged and a description of the construction and arrangement of one will suffice for both. The hanger $e$, for example, has one of its members extended as at $e^2$ to enter a friction block or shoe $m$ which has an elongated slot $m'$ to receive the extension $e^2$ so as to provide for lost motion between the hanger and the shoe, that is between the brake head which is connected to the hanger and the shoe, so as to permit the necessary clearance between the brake shoe and the wheel when the brakes are released. This friction block or shoe is normally stationary, but is capable of movement on its support when required so as to compensate for wear on the brake shoe and wheel. In the embodiment of the invention shown in Figs. 1–6 this brake shoe $m$ is held frictionally between two guide or friction bars $n$ and $n'$. The guide bar $n$ is secured to the inner face of the inner equalizing bar $c'$. The guide bar $n'$ is similarly secured at one end and at the other end is supported in position, as by the bolt $n^2$, and is pressed yieldingly toward the guide bar $n$, as by a spring $n^3$ between the head of the bolt $n^2$ and the guide bar, so that the friction block or shoe $m$ is held frictionally between the two guide bars.

By the construction just described it will be understood that the block $m$ is held yieldingly so that sufficient lateral movement thereof is permitted to absorb undue lateral stresses when imposed upon the hanger. Such lateral movement is of course permitted, to the same degree, of the hanger itself. While the block $m$ is held frictionally in position a relative lateral movement thereof will not destroy its function, since the friction block is always held in the position given it by movement of the lower end of the hanger longitudinally between the friction bars $n$ and $n'$. As illustrated particularly in Fig. 4 the block $m$ may be constructed so that it may never fall freely from the guide bars, by reason of the fact that the lateral movement of the guide bar $n'$ is limited by the head of the bolt $n^2$.

It may be noted that between the head of the bolt $e^3$, by which the brake head $g$ is connected to the hanger $e$, and the adjacent member of the hanger is interposed a spring $e^4$ which permits the necessary lateral play of the brake head with the wheel and takes up looseness.

In the application of the brakes the upper end of the live lever $h$ is moved to the left and the brake head and shoe $g$ and $f$ are likewise moved to the left against the wheel. In this movement the live lever pivots on the brake head, at $g^4$, and the lower end of the live lever moves to the right and, through the automatic adjusting rod $l$ $l'$ moves the lower end of the dead lever $i$ to the right and carries the brake head $g'$ and brake shoe $f'$ toward the adjacent wheel. The brake heads and shoes are supported during these movements by the hangers $e$ and $e'$. When the brakes are released the upper end of the live lever $h$ is moved to the right by the release spring until it strikes the truck bolster. During the first part of this movement and the corresponding movement of the dead lever $i$ the brake shoes drop away from the wheel to the extent permitted by the movement of the lower ends of the hangers in the corresponding friction blocks $m$, the necessary clearance between each wheel and the brake shoe being thus permitted. As the wear on the brake shoes and wheels progresses the movement of the live lever after the necessary clearance is effected becomes greater and the coupling bar $l$ $l'$ is gradually extended, as is well understood. In the next application of the brakes the brake head and hanger are first moved to the left until the lower end of the hanger reaches the left hand end of the slot $m'$ in the block $m$ and then, the movement of the brake head and hanger being continued, the friction block or shoe $m$ is moved farther to the left where it is held by its frictional engagement with the guide bars $n$ and $n'$. The operation with respect to the brake head $g'$ and its connected parts is similar except that the movement, of course, is in the opposite direction. In this manner the two friction blocks or shoes $m$ are moved farther toward the respective wheels to compensate for the increased wear on the brake shoes and wheels as such wear takes place, while the necessary clearance between each wheel and its brake shoe is not interferred with.

It will be noted that the guiding of the hanger at its lower end steadies the brake head and prevents it from twisting off laterally from the wheel through uneven wear on the brake shoe.

In the embodiment of the invention illustrated in Figs. 7 and 8 the hanger $e^5$, pivotally connected as before to the brake head $g$, engages at its lower end a friction block or shoe $m^2$, slotted longitudinally as at $m^3$ as in the construction hereinbefore described so as to provide for the necessary lost motion, and held in frictional contact with two guide or friction bars $o$ and $o'$ as explained with respect to the bars $n$ and $n'$ of Fig. 4. One of these bars is held in firm engagement with the side of the equalizer $c^2$ by a bolt $m^4$ which passes through a slot $m^5$ in the equalizer $c^2$ and receives under its head a friction spring $m^6$.

In the arrangement shown in Fig. 9 the brake head $g$ is directly engaged with the friction block or shoe, instead of through the medium of the hanger. It is shown as having an extension $g^6$ which engages the longitudinally slotted friction shoe $m^7$. The latter is mounted frictionally on a bar $n^6$ which is held on the equalizer $c'$.

Various other embodiments of the invention will suggest themselves in view of the foregoing and it will be understood that the invention is not limited to the particular construction shown and described herein but that it is capable of embodiment in various other constructions which may be required by the conditions of use.

I claim as my invention:—

1. In a brake system, the combination of a brake hanger, a brake head, means to move the same and a friction block or shoe operatively connected with the brake hanger, provisions being made for lost motion between the brake hanger and the friction block.

2. In a brake system, the combination of a brake hanger, a brake head, means to move the same, a friction block operatively connected to the brake hanger, provisions being made for lost motion between the brake hanger and the block, and a bar upon which the block is mounted frictionally.

3. In a brake system, the combination of a truck frame, a bar supported thereby, a longitudinally slotted friction block mounted frictionally on said bar, a brake head, and means for operatively engaging the brake head with the longitudinally slotted block.

4. In a brake system, the combination of a truck frame, a hanger supported thereon, a brake head supported by the hanger, a friction block mounted frictionally on the truck frame, the hanger and the friction block being disposed in operative relation to each other provision being made for lost motion between the two.

5. In a brake system, the combination of a truck frame, a hanger suspended thereon, a brake head supported by the hanger, and a longitudinally slotted friction block engaged by the hanger.

6. In a brake system, the combination of a truck frame, a hanger suspended thereon, a brake head supported by the hanger, a longitudinally slotted friction block engaged by the hanger, and friction bars carried by the truck frame and engaging the friction block.

7. In a brake system, the combination of a truck frame, a hanger suspended thereon, a brake head supported by the hanger, the hanger being extended below the point at which the brake head is attached, and a yielding guide for the extension of the hanger.

8. In a brake system, the combination of a brake hanger, a brake head carried thereby, means to move the same and frictional means to retain the brake hanger in normal position and to permit movement thereof to compensate for wear, provisions being made for lost motion of the brake hanger to give clearance between the brake shoe and the wheel.

This specification signed and witnessed this 20th day of June A. D., 1912.

WILLIAM H. SAUVAGE.

Signed in the presence of—
E. M. TAYLOR,
WORTHINGTON CAMPBELL.